United States Patent [19]

Coyle

[11] 3,931,072

[45] Jan. 6, 1976

[54] PARTICLEBOARD, HARDBOARD, AND PLYWOOD PRODUCED IN COMBINATION WITH A LIGNIN SULFONATE-PHENOL FORMALDEHYDE GLUE SYSTEM

[75] Inventor: Robert P. Coyle, Anderson, Calif.

[73] Assignee: Champion International Corporation, Stamford, Conn.

[22] Filed: Aug. 24, 1972

[21] Appl. No.: 283,573

[52] U.S. Cl. .............................. 260/17.5; 156/335
[51] Int. Cl.² ..................... C08H 5/02; C08L 61/10
[58] Field of Search .................................. 260/17.5

[56] References Cited

UNITED STATES PATENTS

| | | | |
|---|---|---|---|
| 2,282,518 | 5/1942 | Hochwalt et al. | 260/53 |
| 3,076,772 | 2/1963 | Christ | 260/17.2 |
| 3,095,392 | 6/1963 | Herrick | 260/17.5 |
| 3,296,159 | 1/1967 | Lissner | 260/17.5 |
| 3,308,218 | 3/1967 | Wiegand et al. | 264/121 |
| 3,336,185 | 8/1967 | Helbing | 161/170 |
| 3,658,638 | 4/1972 | Ludwig et al. | 161/262 |
| 3,677,884 | 7/1972 | Bornstein | 161/262 |
| 3,790,441 | 2/1974 | Ashall | 161/198 |
| 3,790,442 | 2/1974 | Ashall | 161/198 |

*Primary Examiner*—Donald E. Czaja
*Assistant Examiner*—Earl A. Nielsen
*Attorney, Agent, or Firm*—Evelyn M. Sommer, Esq.; Anthony J. Casella, Esq.

[57] ABSTRACT

Improved lignocellulosic particleboard, hardboard, and plywood are produced using a lignin sulfonate-phenol formaldehyde glue system. Preferred products are secured by using Douglas fir chips in combination with a unique technique of blending the lignin sulfonate with a phenol and formaldehyde. A specific technique is to react lignin sulfonate with formaldehyde under influence of caustic and heat and then to react the resulting compound with phenol formaldehyde resin to secure a more effective final glue system.

3 Claims, No Drawings

PARTICLEBOARD, HARDBOARD, AND PLYWOOD PRODUCED IN COMBINATION WITH A LIGNIN SULFONATE-PHENOL FORMALDEHYDE GLUE SYSTEM

The present invention is generally concerned with improved particleboard, plywood and hardboard products which can be economically produced. In accordance with the present process an extended phenol formaldehyde glue system is used which comprises a lignin sulfonate salt. The extended system in a preferred modification is secured by reacting lignin sulfonate with formaldehyde under influence of caustic and heat. The resulting product is then reacted with phenolic resin to secure a very reactive final glue system.

The manufacture of hardboard and particleboard products are well known in the art. Generally these boards are produced using random geometric configuration wood chips such as described in U.S. Pat. No. 2,642,371, issued June 16, 1953, entitled "Composite Wooden Board", inventor Fahrni, and U.S. Pat. No. 2,686,143, issued Aug. 10, 1954, entitled "Process for Manufacturing Composite Wooden Board", inventor Fahrni. The particleboards may be a single homogeneous ply or may be multiply, such as a core ply of relatively coarse chips and two face plies of relatively flat elongated chips. Generally these particleboards are manufactured using a glue system to adhere the particles one to the other and then subjecting the mat mass to heat and pressure for predetermined time periods.

The hot press conditions may vary widely depending upon operating factors such as type of panel, thickness of panel, etc. Temperatures may range from about 250°F to 600°F, such as about 330°F, pressure from about atmospheric to 1000 psi, such as about 50 psi to 200 psi, and the time periods from about 1 minute to about 10 minutes.

Many types of glue systems have been used. Two well known systems comprise a phenol formaldehyde system and a urea formaldehyde system. Since these glue systems constitute a large proportion of the manufacturing cost, many extenders have been tried and used commercially. However, those known extenders have not been successful due to the fact that, if used in the desired economical amounts, the resulting strengths of the board products are appreciably impaired.

It has now been discovered that a phenol formaldehyde glue system may be effectively extended by the incorporation therein of a lignin sulfonate salt, such as ammonium lignin sulfonate and an alkali metal lignin sulfonate such as sodium and/or potassium lignin sulfonate.

The preferred salt is sodium lignin sulfonate. The amount of lignin sulfonate salt used may vary appreciably as compared to the phenol formaldehyde resin, but is in the range by weight of about 25% to 60%, preferably 30% to 50%, such as about 40% based on resin solids. When using these amounts it is essential that the pH of the system be maintained above about 10.0, as in the range of about 10.4 to 11.5, such as about 11.0.

The mol ratio of phenol to formaldehyde in the system may vary widely. The preferred ratio of phenol to formaldehyde is from 1 to 1.25, to 1 to 2.5. A very desirable ratio is 1 to 1.85.

The lignin sulfonates used (lignosulfonates) are made from the lignin of sulfite pulp mill liquids. The lignin sulfonates are a light tan to dark brown powder and are stable in the dry form. They are nonhygroscopic with no definite melting point and decompose above about 200°C. The viscosity in an aqueous 50% solids solution ranges from about 120 to 600 cps and the specific gravity is about 1.0 to 2.0, such as about 1.5.

The present invention may be fully understood by the following examples illustrating embodiments of the same.

EXAMPLE I

Sodium lignin sulfonates as described were diluted to form an aqueous solution containing 40% solids. This solution was then added to an advanced phenol formaldehyde resin in concentrations of 25%, 30% and 50% (based on total solids). The pH was adjusted using NaOH to a range from about 10.4 to 11.5. The extended glue system was sprayed on Douglas fir flakes using 8% by weight based on oven dry wood (O.D.). A control glue system of regular phenol formaldehyde was also prepared.

Three quarter inch test panels were prepared to secure a three layer board with a 0.660 g/cc density and about 7% by weight of moisture content after pressing. The glue systems as described were used in the face layer flakes. The panels were prepressed at 75 psi and then hot pressed at 320° to 340°F for 6 to 8 minutes at 225 psi. The results are listed in the following Table I.

TABLE No. 1

PHYSICAL PROPERTIES Vs. pH CHANGE IN HYBRID BOARDS WITH 3 LEVELS OF LIGNIN SULFONATE IN FACE LAYER

| Board No. | % Sulfonate in Face | pH | g/cc Density | * I.B. | ** Face Strength | *** 24 Hour Swell % | **** 24 Hour Water Abs. | Stability[1] 48 Hr. | 7 Day | Smoothness[2] Start | 48 Hr. | 7 Day |
|---|---|---|---|---|---|---|---|---|---|---|---|---|
| 1 | 25% | 10.5 | .656 | 88 | 274 | 4.8 | 19.0 | | | | | |
| 2 | 25% | 10.7 | .654 | 77 | 262 | 5.1 | 21.3 | | | | | |
| 3 | 25% | 11.0 | .659 | 83 | 249 | 5.3 | 19.8 | | | | | |
| 4 | 25% | 11.3 | .654 | 74 | 247 | 7.1 | 23.3 | | | | | |
| 5 | 25% | 11.5 | .660 | 73 | 240 | 6.9 | 23.1 | | | | | |
| 6 | None | 10.5 | .651 | 64 | 244 | 6.0 | 21.2 | | | | | |
| 7 | 50% | 10.4 | .693 | 104 | 299 | 7.5 | 20.9 | | | | | |
| 8 | 50% | 10.7 | .692 | 103 | 290 | 6.6 | 19.9 | | | | | |
| 9 | 50% | 11.0 | .695 | 105 | 270 | 8.1 | 20.6 | | | | | |
| 10 | 50% | 11.3 | .689 | 111 | 290 | 8.4 | 22.1 | | | | | |
| 11 | None | 10.5 | .689 | 92 | 297 | 5.9 | 19.0 | | | | | |
| 12 | 30% | 10.4 | .662 | 77 | 251 | 6.8 | 24.1 | .12 | .24 | 425 | 667 | 700 |
| 13 | 30% | 10.7 | .653 | 60 | 232 | 7.6 | 25.7 | | | | | |
| 14 | 50% | 10.4 | .657 | 65 | 242 | 8.2 | 27.0 | .12 | .22 | 392 | 633 | 750 |
| 15 | 50% | 10.7 | .657 | 54 | 230 | 11.3 | 30.0 | | | | | |

TABLE No. 1-continued
PHYSICAL PROPERTIES Vs. pH CHANGE IN HYBRID BOARDS WITH 3 LEVELS OF LIGNIN SULFONATE IN FACE LAYER

| Board No. | % Sulfonate in Face | pH | g/cc Density | * I.B. | ** Face Strength | *** 24 Hour Swell % | **** 24 Hour Water Abs. | Stability[1] 48 Hr. | 7 Day | Smoothness[2] Start | 48 Hr. | 7 Day |
|---|---|---|---|---|---|---|---|---|---|---|---|---|
| 16 | None | 10.5 | .659 | 61 | 250 | 6.7 | 24.1 | .17 | .22 | 383 | 633 | 683 |

Hybrid Boards - A core and face layer of different materials, i.e. Douglas fir flakes in faces and fine splinter particles in core. Face layers from about 1/32" to 1/4" and core from about 1/6" to 2".
* I.B. Internal Bond (Tension perpendicular to surface to break board) A.S.T.M. D 1037-60T Sec. 27-32
** Face Strength - Face strength of the surface layer. Tabs are glued to the surface and the perpendicular pull to break the surface from the core recorded. (P.S.I.)
*** 24 Hr. Swell - A.S.T.M. D 1037-60T Sec. 69-75
**** 24 Hr. Water Abs. A.S.T.M. D 1037-60T Sec. 69-75
[1]Stability - A.S.T.M. D 1037- 60T Sec. 76-79
[2]Smoothness - Relative measurement of increase in surface roughness after exposure to high relative humidity From the foregoing it is apparent that excellent particleboards are secured when extending the phenol formaldehyde resin with sodium lignin sulfonate providing the pH is maintained relatively high.

EXAMPLE II

A second set of panels were prepared as described in Example I, using 30% to 50% by weight of sodium lignin sulfonate with the pH adjusted to 10.4 and 10.7 with caustic. Superior face properties were secured. The panels were tested at each level of extension, and stabilities and surface smoothness were taken after 2 days and 7 days at 70°F and 90% relative humidity (R.H.). Stability and surface roughening were about the same when using only phenol formaldehyde resin. Thus the phenolic resin can be extended up to about 50% with sodium lignin sulfonate if the pH is maintained above about 10.3 to 10.5. See data for boards 12, 14 and 16 (Table I).

psi of about 225. The face layers had a thickness of about ⅛ inch and the core layer a thickness of about ⅛ inch. The core layer was glued only with a urea formaldehyde resin.

Sections of each panel were placed in a humidity cabinet at 90% relative humidity (R.H.) at 90°F for three days to evaluate moisture resistance of the face layers. Thickness swells were measured and face strengths tested after this time. No significant decreases occurred from 30% to 60% by weight extension with the sodium lignin sulfonate.

Other operations were carried out using pine planer shavings in the face layers with 8% by weight of glue. Also higher levels of sodium lignin sulfonate were used. (30% to 90%). With the pine faces, a decrease in physical properties occurred as the percentage of sulfonate increased. A 50% level of extension is desirable. The results are listed in the following Table II.

TABLE No. II

| Board No. | g/cc Density | Material | MAXIMUM EXTENSION Extension %Na Sulfonate | ** Face Strength | ON TWO SPECIES Thickness Swell 3 Days Hi.R.H. | Face Strength 3 Days Hi.R.H. | * I.B. |
|---|---|---|---|---|---|---|---|
| 17 | .661 | D.Fir P.S. | 30 | 274 | 4.2% | 193 | 99 |
| 18 | .658 | " | 34 | 265 | 4.4 | 173 | 108 |
| 19 | .659 | " | 38 | 263 | 4.2 | 166 | 95 |
| 20 | .657 | " | 40 | 266 | 3.8 | 163 | 94 |
| 21 | .659 | " | 44 | 281 | 4.2 | 175 | 102 |
| 22 | .662 | " | 47 | 286 | 4.3 | 179 | 113 |
| 23 | .659 | " | 51 | 294 | 4.2 | 189 | 103 |
| 24 | .659 | " | 54 | 273 | 4.4 | 180 | 90 |
| 25 | .658 | " | 58 | 311 | 4.4 | 165 | 107 |
| 26 | .661 | " | 60 | 278 | 3.9 | 159 | 104 |
| 27 | .637 | " | 100 | 92 | 9.7 | Failed | 75 |
| 28 | .680 | Pine P.S. | 30 | 251 | — | — | 104 |
| 29 | .683 | " | 50 | 243 | — | — | 104 |
| 30 | .688 | " | 60 | 220 | — | — | 105 |
| 31 | .681 | " | 70 | 206 | — | — | 107 |
| 32 | .684 | " | 80 | 170 | — | — | 106 |
| 33 | .684 | " | 90 | 124 | — | — | 85 |

*,** See Table I

EXAMPLE III

Additional panels were prepared as described in Example I. Pine and Douglas fir planer shavings were used. In all cases 8% by weight of resin was used based on the chips. A sodium lignin sulfonate content of various amounts was used in the phenol formaldehyde resin utilized in the face layers. The lignin sulfonate had a pH of 9.0 and the extended resin a pH of 10.3 to 10.5.

Three-eighths inch thick panels were prepared as described, pressing for about 6.5 minutes at 330°F at a

EXAMPLE IV

In another series of tests ⅜ inch panels were prepared as described in Example I using 8% by weight of phenol formaldehyde resin in the face and a urea formaldehyde resin in the core. The chips in the face were Douglas fir shavings.

One set of panels was prepared using as the glue system a phenol formaldehyde resin containing 30% of sodium lignin sulfonate while the other set was prepared using a non-extended phenol formaldehyde resin. The results secured are listed in the following Table III.

TABLE III

COMPARISON OF 30% SODIUM LIGNIN SULFONATE AND 70% WT. PHENOL FORMALDEHYDE RESIN vs. PHENOL FORMALDEHYDE RESIN AT DIFFERENT PRESS TEMPERATURES

| Board No | g/cc Density | % Sulfonate | PRESS Temperature | Time | Face Strength | Internal Bond |
|---|---|---|---|---|---|---|
| 34 | .685 | 30% | 230°F | 10 min. | 174 | 104 |
| 35 | .699 | 30 | 250 | 10 | 225 | 120 |
| 36 | .699 | 30 | 270 | 10 | 248 | 122 |
| 37 | .698 | 30 | 290 | 8 | 255 | 129 |
| 38 | .684 | 30 | 320 | 6 | 251 | 124 |
| 39 | .723 | None | 230 | 10 | 235 | 114 |
| 40 | .710 | None | 250 | 10 | 251 | 122 |
| 41 | .707 | None | 270 | 10 | 263 | 118 |
| 42 | .704 | None | 290 | 8 | 258 | 119 |
| 43 | .697 | None | 320 | 6 | 270 | 119 |

TABLE IV.

OUTDOOR DURABILITY OF 35% SODIUM LIGNIN SULFONATE IN THE FACE -vs- PHENOLIC RESIN

| Board No. | Sulfonate | Density g/cc | I.B. | Face Strength | 24 Hour Swell | 24 Hr. Water Abs. | 1 Hr Boil | Thickness Swell After 1 Cycle | After 2 Cycle |
|---|---|---|---|---|---|---|---|---|---|
| 44 | 35% | .657 | 85 | 284 | 15.3 | 56.1 | .042" | .067" | .075" |
| 45 | 0 | .660 | 93 | 319 | 14.8 | 57.1 | .046" | .064" | .075" |

From the above it is apparent that when using a phenol formaldehyde resin containing 30% by weight of sodium lignin sulfonate the press temperature should exceed about 270°F, preferably in the range of about 290°F to 320°F, such as about 300°F. The press cycle should range from about 6 to 10 minutes such as about 8 minutes. The longer press cycles do not help at the low temperatures.

EXAMPLE V

Other tests were conducted to determine the outdoor durability of the respective panels prepared as hereinbefore described. The results secured are listed in Table IV. The panels were 3/4" and the lignin sulfonate containing phenol formaldehyde resin had a pH of 9.0. Both panels had a 10% glue content in the face and 6% glue in the core. 1% wax was also sprayed on the core. Pine planer shavings were used as the face material and the panels were pressed as hereinbefore described.

The glue content based on the weight of the wood particles may vary appreciably depending on many manufacturing variables. Generally the glue content is in the range of about 4% to 15%, preferably about 7% to 9%.

The foregoing results show that the addition of the lignin sulfonate has only a slight effect on swell and water absorption.

EXAMPLE VI

Additional tests were conducted to determine the effect of sodium lignin sulfonate extended phenol formaldehyde glue systems at three different levels of glue content (10%, 9% and 8%). The results secured are shown in Table V. The particleboards were ¾ inch thick and the press cycle was as hereinbefore described.

TABLE V

TABULATION OF BOARD PROPERTIES OF PHENOLIC * VS. PHENOLIC LIGNIN SULFONATE RESINS

| Board No. | Glue Used | Glue Con. | Type TM | I.B. PSI | Face Stgth. | 24 Hr. Swell | Water Abs. | MOR | MOE | Warp Index | Density g/cc |
|---|---|---|---|---|---|---|---|---|---|---|---|
| 46 | Pure Phenolic | 10% | D. fir Flake | 79 | 278 | 10.4 | 35.2 | 3170 | 504,- | 5.5/65 | .661 |
| 47 | Pure Phenolic | 9 | " | 79 | 277 | 10.8 | 36.0 | 2790 | 455,- | 5.0/64 | .661 |
| 48 | Pure Phenolic | 8 | " | 81 | 264 | 11.8 | 40.1 | 2890 | 491,- | 7.0/64 | .659 |
| 49 | 25% Sulfonate 75% Phenolic | 10 | " | 77 | 258 | 14.9 | 2990 | 479,- | 6.0/64 | .654 | |
| 50 | 75% Phenolic | 9 | " | 79 | 252 | 13.9 | 41.1 | 2790 | 467,- | 7.0/64 | .652 |
| 51 | 75% Phenolic | 8 | " | 69 | 254 | 15.8 | 46.2 | 2830 | 439,- | 7.0/64 | .650 |

*Phenol formaldehyde resin.

It is apparent from the foregoing that excellent results are secured with a 25% lignin sulfonate extended phenol formaldehyde resin.

In other tests the sodium lignin sulfonate extended phenol formaldehyde resin (up to 40%) was equivalent to the non-extended resin in properties such as compatibility with various fillers and sealers, and also ability to accept overlays. Fire retardant salts are also very compatible with the lignin sulfonate extended resin.

The preferred technique of preparing the extended lignin sulfonate phenol formaldehyde glue system is to prepare a lignin sulfonate formaldehyde prepolymer solution. This prepolymer solution is prepared by heating lignin sulfonate with caustic, such as NaOH at an elevated temperature in the range of about 80°C to 110°C for a time period in the range of about 15 to 45 minutes. This solution is preferably cooled and formaldehyde added, and then reheated and allowed to exotherm until the formaldehyde is consumed. Generally about 3% to 10% by weight of formaldehyde, such as about 6% is added based on the lignin sulfonate.

This prepolymer solution containing about 3% to 10% formaldehyde is allowed to cool and phenol is added. Then additional formaldehyde is added and the solution heated to a temperature in the range of about 80°C to 110°C for a time period of about 20 to 60 minutes.

While the foregoing technique produces a glue system having the strongest bonds and is much preferred, under certain conditions the lignin sulfonate formaldehyde prepolymer solution may be mixed with a finished phenol formaldehyde resin, or the solution may be added to a phenol formaldehyde resin, or the solution may be added to a phenol formaldehyde prepolymer and advanced to the desired viscosity, the preferred viscosity is in the range of 1000 to 1500 cps at 50% solids at 25°C. The following will illustrate the preferred technique for producing the glue system of the present invention.

EXAMPLE VII a. 220 grams of 50% sodium lignin sulfonate was heated at 90°C ± 5°C for 30 minutes
{110 g. sodium lignin sulfonate
{110 g. $H_2O$ with 100 grams 50% $N_aOH$ solution
{50 $N_aOH$
{50 $H_2O$ b. The solution of (a) was cooled to 40°C, and sufficient grams of 37% formaldehyde added to secure a prepolymer solution containing from about 3% to 10% by weight of formaldehyde. This prepolymer solution was then heated to 90°C ± 5°C and allowed to exotherm until completion.

c. The lignin formaldehyde prepolymer solution was cooled to 60°C and 110-120 grams of 90% phenol added. Then an additional 250 grams of 37% formaldehyde was added and the mixture heated to 100°C for a period of 40 minutes. The pH of the final resin was 10.3 to 10.7. Caustic may be added during advancement to secure this pH level.

Another method of preparing a very satisfactory glue mix for exterior plywood is described in the following example:

EXAMPLE VIII

In a first step the following ingredients were mixed for 5 minutes

| | Grams |
|---|---|
| (a) Water | 1320 |
| (b) Anti-foam agent Parac 5609* | 10 |
| (c) Phenol formaldehyde resin 43% solids Amures 5587** | 1600 |
| (d) Ground corn cobs filler | 800 |
| (e) Wheat flour | 400 |

In a second step caustic was added and mixed for 10 minutes.

| | |
|---|---|
| (f) NaOH (50% aqueous solution) | 440 |
| Finally was added | |
| (g) Soda ash | 120 |
| with | |
| (h) X + Y grams of ⓧ phenol formaldehyde resin 5587** Ⓨ of sodium lignin sulfonate (50%) to make a mix containing from 40% total weight of phenol formaldehyde resin replaced with lignin sulfonate. This will equal 6960 grams of phenol formaldehyde for 0% extension level and 3520 grams of phenol formaldehyde resin plus 2960 grams of sodium lignin sulfonate (50%) for 40% extension level. | |

*Trademark of Pacific Resins, Tacoma, Wash.
**Pacific Resin - Tacoma, Wash. - trademark The panels prepared as described, using mixers as described, are listed in Table VI. The glue spread is in pounds per 1000 square feet and is a single glue line (SGL).

TABLE VI

LIGNIN EXTENDER FOR EXTERIOR PLYWOOD PHENOLIC RESIN

| Bd. No. | Thickness | Species | Extension Level Wt/Wt | Press Cycle Time Min. | Temp F° | Press | Glue Spread lbs/MSP | Shear Tests Dry | | Vacuum Press Soak | | 4 + 4 Hour Boil | |
|---|---|---|---|---|---|---|---|---|---|---|---|---|---|
| | | | | | | PSI | Lbs. | PSI | WF[1] | PSI | WF | PSI | WF |
| 1 | ⅝ | D.Fir | 0% | 6.5 | 270 | 175 | 35 | 164 | 90 | 105 | 60 | 80 | 100 |
| 2 | ⅝ | D.Fir | 5 | 6.5 | 270 | 175 | (SG-L) | 221 | 95 | 230 | 60 | 153 | 100 |
| 3 | ⅝ | D.Fir | 10 | 6.5 | 270 | 175 | '' | 180 | 95 | 160 | 55 | 175 | 95 |
| 4 | ⅝ | D.Fir | 15 | 6.5 | 270 | 175 | '' | 231 | 95 | 120 | 90 | 103 | 100 |
| 5 | ⅝ | D.Fir | 20 | 6.5 | 270 | 175 | '' | 246 | 90 | 200 | 55 | 123 | 90 |
| 6 | ⅝ | W.Fir | 0 | 7.0 | 285 | 175 | 35 | 245 | 95 | 240 | 95 | 200 | 95 |
| 7 | ⅝ | W.Fir | 10 | 7.0 | 285 | 175 | 35 | 161 | 95 | 120 | 95 | 90 | 95 |
| 8 | ⅝ | W.Fir | 20 | 7.0 | 285 | 175 | 35 | 230 | 100 | 150 | 100 | 155 | 100 |
| 9 | ⅝ | W.Fir | 30 | 7.0 | 285 | 175 | 35 | 216 | 100 | 140 | 95 | 188 | 90 |
| 10 | ⅝ | W.Fir | 40 | 7.0 | 285 | 175 | 35 | 250 | 95 | 120 | 80 | 90 | 90 |
| 11 | *⅜ | W.Fir | 0 | 6.5 | 310 | 175 | 35 | 160 | 100 | 94 | 100 | 130 | 100 |
| 12 | ⅜ | W.Fir | 10 | 6.5 | 310 | 175 | 35 | 193 | 100 | 140 | 100 | 140 | 100 |
| 13 | ⅜ | W.Fir | 20 | 6.5 | 310 | 175 | 35 | 215 | 100 | 180 | 90 | 175 | 95 |
| 14 | ⅜ | W.Fir | 30 | 6.5 | 310 | 175 | 35 | 166 | 90 | 100 | 90 | 138 | 90 |
| 15 | 1⅛ | W.Fir | 0 | 12.5 | 310 | 175 | 35 | 187 | 100 | 80 | 95 | 73 | 100 |
| 16 | 1⅛ | W.Fir | 10 | 12.5 | 310 | 175 | 35 | 232 | 100 | 95 | 100 | 122 | 100 |
| 17 | 1⅛ | W.Fir | 20 | 12.5 | 310 | 175 | 35 | 198 | 100 | 30 | 100 | 128 | 100 |
| 18 | 1⅛ | W.Fir | 30 | 12.5 | 310 | 175 | 35 | 165 | 100 | 65 | 95 | 73 | 100 |

*Two per Daylight
[1]Wood failure

The embodiments of the invention in which an exclusive property of privilege is claimed are defined as follows:

1. Process for the preparation of an improved glue system for adhering wood particles to each other which comprises preparing a lignin sulfonate formaldehyde prepolymer by heating a solution of a salt of a lignosulfonic acid with an alkali metal hydroxide, thereafter adding a first amount of formaldehyde to form said prepolymer, thereafter adding phenol to said prepolymer followed by the addition of a second amount of formaldehyde, and heating the resulting mixture to form the glue system.

2. Process as defined by claim 1 wherein said salt is the sodium salt, and wherein said salt of lignosulfonic acid and said alkali metal hydroxide solution is heated to a temperature in the range of about 80° to 110°C, said solution being cooled before adding said first amount of said formaldehyde, followed by reheating said solution and said first amount of formaldehyde, allowing the solution to exotherm until the formaldehyde is consumed, cooling the resulting reaction mixture and adding thereto said phenol, followed by the addition of said second amount of said formaldehyde, followed by heating to a temperature in the range of about 80° to 110°C for a time period in the range of about 20 to 60 minutes.

3. Process as defined by claim 1 wherein sufficient alkali metal hydroxide is used to secure a glue system having a pH in the range of about 10.3 to 10.7.

* * * * *